Aug. 23, 1966   R. G. MATTHEWS   3,267,660

METHOD OF SECURING FASTENERS IN STICK FORM

Filed Aug. 30, 1963

INVENTOR.
Richard G. Matthews
BY
Hill, Sherman, Meroni, Gross & Simpson
ATTORNEYS

United States Patent Office 3,267,660
Patented August 23, 1966

3,267,660
METHOD OF SECURING FASTENERS
IN STICK FORM
Richard G. Matthews, Park Ridge, N.J., assignor, by mesne assignments, to Swingfast, Inc., Long Island City, N.Y., a corporation of New York
Filed Aug. 30, 1963, Ser. No. 305,645
9 Claims. (Cl. 59—77)

The present invention relates to improvements in the securing together in stick form of thermoplastic coated fasteners, and more especially heavy duty fasteners, including staples, brads, pins, nails and the like.

Substantial improvement has been attained by coating fasteners and more particularly heavy duty fasteners of staple, brad, nail and like form with thermoplastic material, of which vinyl and nylon types of synthetic resins are exemplary. Nylon has been found to afford especially desirable results for use in coating linearly force driven fasteners of the class indicated. Experience has shown that not only does the nylon coating facilitate driving such fasteners, but there is also improved retention of the fasteners in the article into which driven, and more especially in wood. The demonstrable superior holding power of nylon coated fasteners is variously theorized. One theory is that there may be at least some polymeric cross linking with resinous or other natural constituents of the wood. Another theory holds that the principal reason for superior holding power results from the excellent elastic memory recovery factor of nylon, whereby on driving into an object it compresses and elongates and in its finally seated or engaged relation in the fastened member or members the nylon tends to go back to its original position, thereby pushing itself against the wall of the hole the fastener has made in the object and conforming to pits and irregularities in such wall to effect a substantially interlocked relationship. An interesting treatise on the subject is found in U.S. Department of Commerce publication PB181296 entitled "Polymeric Compounds To Improve the Holding Power of Wood Fasteners."

These fasteners of the staple, pin, brad and nail type are customarily made from suitable gauge wire, generally mild steel, precoated with the thermoplastic coating, and the wire as supplied in large mill coils is converted in suitable shaping and forming machinery into the desired form of fastener.

For use in semi-automatic driving equipment, such as mallet driven or pneumatically driven fastener driving machines, it is customary to secure the fasteners in what is commonly referred to as "stick" form for ease in handling and loading into the driving machines. Commonly a suitable adhesive is employed by which the fasteners in co-extensive side-by-side serial abutment are more or less rigidly adhered in the desired length strips or sticks. The most generally employed adhesive is of the quick-drying hard-setting cellulosic-base type applied as a connective ribbon in liquid form to the fasteners in stick relationship and, on drying, holding the fasteners firmly, but releasing the individual fasteners as they are driven.

Several disadvantages are inherent in the adhesively secured fasteners, among which may be mentioned tendency of the adhesive to deteriorate in storage, brittleness of the adhesive and thus undue tendency to breaking apart or separation of the fasteners in handling and transportation, interference by the ribbon of adhesive with entry of the fasteners into the driving passage of the driving machine and thus promoting jamming of the driving mechanism, "gumming up" of the driving mechanism from accumulation of dislodged adhesive, and release of dangerous fumes from the volatile solvents during manufacture of the sticks of fasteners.

In addition, considerable difficulty has been experienced in compounding adhesive which will properly hold plastic coated fasteners and more particularly those coated with nylon. Moreover, it has been found that nylon covered fasteners secured together by means of adhesive material in the conventional manner do not have as effective holding power as do the same fasteners without the adhesive.

It is, accordingly, an important object of the present invention to provide thermoplastically coated machine-driveable fasteners in stick form without the use of any means except the thermoplastic coating itself to retain the fasteners in separable stick relationship.

Another object of the invention is to improve the attachment of thermoplastically coated fasteners into sticks suitable for handling and loading into fastener driving machines.

A further object of the invention is to provide a new and improved method of securing thermoplastically coated fasteners into sticks suitable for loading into the magazines of fastener driving machines.

Still another object of the invention is to provide a new and improved method of producing sticks of thermoplastically coated fasteners possessed of superior resistance to separation of the fasteners in the course of normal handling, but readily individually separable for driving in a fastener driving machine, and possessed of superior holding power in a member into which driven.

Other objects, features and advantages of the present invention will be readily apparent from the following detailed description of certain preferred embodiments thereof taken in conjunction with the accompanying drawing, in which.

Figure 1:
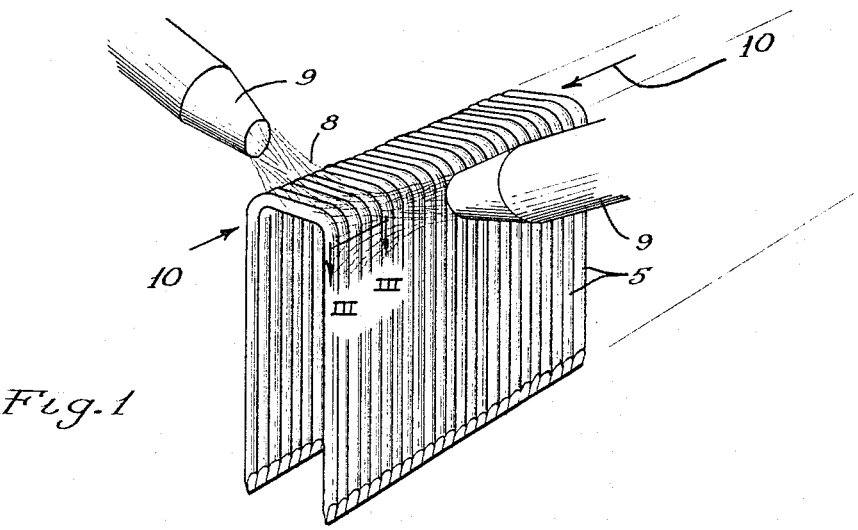
FIGURE 1 is a schematic, perspective view of a stick of staples and demonstrating one representative manner of securing the staples in stick form.
Figure 3:
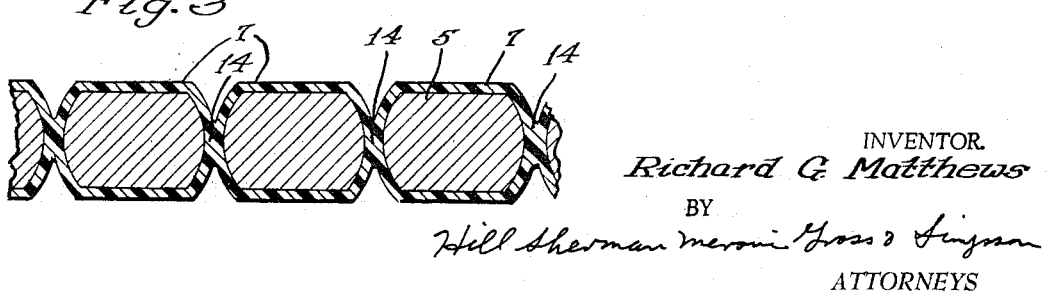
FIGURE 3 is a substantially enlarged fragmentary sectional detail view taken substantially on the line III—III of FIGURE 1.

Having reference to FIGURE 1, an assembly of fasteners in the form of staples 5 is depicted in coextensive side-by-side serially related abutment as assembled for uniting into a stick. Each of the staples is of inverted U-shape having the usual crown of any preferred width and parallel co-extensive legs of preferred length provided with any preferred form of penetrating point or tip. This kind of staple is of the type especially suitable for industrial, heavy duty purposes and is made from a suitable gauge of usually mild steel wire, consistent with the intended utility. As best seen in FIGURE 3, the wire is desirably of flattened cross-section with opposed longitudinal flat faces located at respectively the inner and outer sides of the legs and crowns of the staples, and intermediate convexly arcuate opposed faces in the face planes of the staples and opposing the corresponding rounded faces of the adjoining staples in the stick.

A precoat 7 of a thermoplastic synthetic resin of which a nylon of the type which remains essentially solid at temperatures substantially above those which would normally be encountered in ordinary usage has been found desirable, is applied as nearly as practicable uniformly and continuously throughout the length of the wire. The nylon coat 7 is of a character and thickness which although in a relatively thin uniform layer is, highly resistant to chipping, cracking or abrasion in the fastener forming machine and forming dies and of a sufficiently high melting point to avoid fusion at the normal operating temperatures encountered in the forming machinery, so that in the finished fasteners the coat 7 will be substantially undisturbed throughout the uncut length of the staple 5.

According to the present invention, the precoat 7 is employed to secure the staples 5 in stick relationship. For this purpose, the thermoplastic qualities of the material of the coating is taken advantage of to fuse the staples together. Such fusing may be accomplished in any desirable manner by which fusing heat can be applied to the finished fasteners while oriented in stick relationship.

By way of example, heating of the thermoplastic coats 7 of the stick-oriented staples may desirably be effected by means of clean-burning flame 8. Excellent results have been obtained where a pair of the flames 8 is directed by respective nozzles 9 toward the crowns and a limited length of the adjacent portions of the legs of the staples 5, while leaving the remaining and major lengths of the legs to the tips thereof free from heating, substantially as shown in FIGURE 1. Commercial heating gas and oxygen or air mixture provides a suitable heat source flame. Application of the flames 8 is controlled to be of an intensity and for a duration sufficient to soften the thermoplastic coats 7 in the area of the fasteners subjected to heating to effect fusing of the abutting portions of the coats 7 of contiguous fasteners while the stick oriented series of fasteners is held under substantially uniform pressure longitudinally of the stick as shown by the directional arrows 10. The mechanism for orienting the staples and pressing the stick-oriented staples together may be the same as that commonly employed in the conventional adhesive sticking of staples and is therefore not illustrated since it is well known to those familiar with this art.

Relative movement longitudinally of the stick-oriented staples 5 is effected between the staples and the nozzles 9 at a proper speed to accomplish the desired fusion heating of the affected coat areas, either by movement of the staples past the flame nozzles or movement of the nozzles relative to the staples, and the pressure indicated by the arrows 10 is maintained while the fused thermoplastic coats 7 of the staples are cooled as by passing of the stick through a cooling zone downstream from the heating nozzles 9 in the direction of movement of the staple stick in a continuous flow manufacturing system where the stick formation is accomplished as a continuous part of the staple making process, inclusive of formation of the staples, orienting of the staples in the stick form and fusing of the staples into self-sustaining sticks.

Figure 2:
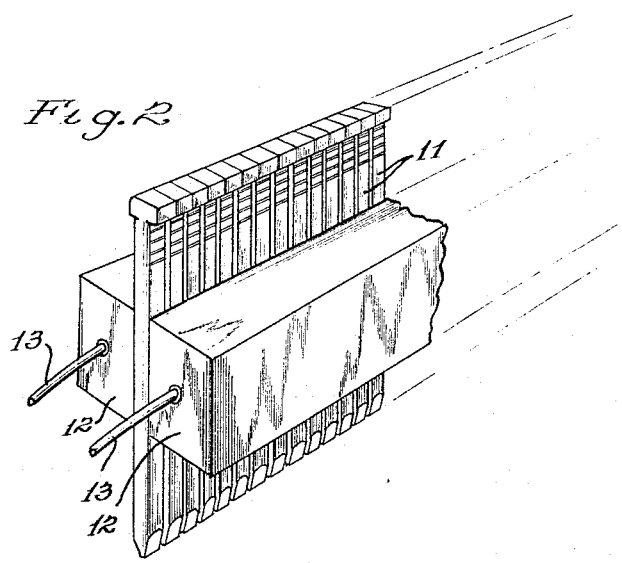
FIGURE 2 is a schematic, perspective view of a stick of brads or nails and demonstrating another manner of separably affixing fasteners to one another serially according to the present invention.

In FIGURE 2 is depicted an alternative means for attaining the new and improved results of the present invention applied, by way of example, to the fusing of sticks of thermoplastically coated pin or nail type fasteners 11. This type of fastener is referred to as a pin when headless, and is often used for sash pinning, and as a brad or nail where provided with a head, as shown, and depending on size and relative proportions of shank and head. This single leg or shank type of fastener is adapted also to be fashioned from precoated wire stock in high speed production machinery with the fasteners either collected from the forming machine in a haphazard mass and then collated into stick form relationship in a second machine or directly collated as produced into the stick form relationship, depending on the preferred manufacturing set-up, nature and size of the fastener, and the like.

Fusing of the thermoplastic coats of the fasteners 11 as they are maintained in firm side-by-side co-extensive stick form abutment if effected in this instance by a desirable form of electrical heating. This is conveniently accomplished, in one form, by one or more induction heaters 12, illustrated diagrammatically. Two of the induction heaters 12 are shown, of elongated form longitudinally of the stick of fasteners, disposed in opposition to one another on opposite sides of the stick of fasteners, and of a width to be effective on limited length portions of the fasteners intermediate the ends thereof. A suitable source of power is connected to the induction heaters 12 through respective electrical cables 13. While individual stick form assemblies of the fasteners 11 may be moved into position between the heaters 12 in succession, a continuous or running succession of the fasteners 11 assembled in the stick relationship may pass between the heaters. The length and mounting of the heaters 11 will, of course, depend upon the preferred mode of operation of the apparatus in practicing the method of this invention.

Similarly as where direct flame heating is employed, electrical heating is practiced in such a manner as to impart to the affected area of the thermoplastic coats of the fasteners 11 sufficient heat to effect fusing of the contiguous portions of the coats in the heated area without substantially disturbing the character or protective and fastener-holding power qualities of the coating.

Actually, the sectional illustration of FIGURE 3 can be taken as exemplary of the end result of the fusion bonding, cohering in stick form of any style of the fasteners, whether dual leg as represented by the staples 5 or single leg as represented by the nails or brads 11, and irrespective to the manner in which the fusing heat is applied. As a result of fusion of the contiguous portions of the thermoplastic coat on the adjoining fasteners, a monolithic juncture coupling 14 is formed which, on solidification and hardening when cooled after fusion has been completed is as hard and resistant to disruption as the remainder of the coatings on the joined fasteners and effectively resists unintentional severance. Such resistance to severance and thus separation of the fasteners at the bonds 14 has been found to be substantially superior to sticks of the same fasteners secured together by means of a separately applied adhesive. Further, the bond 14 is possessed of all of the inherent qualities of the coating, resisting deterioration, embrittlement, and the like. No weight is added to the fasteners, as is the case where a gluing substance is applied. No oversize band or collar or area is present on the fasteners to interfere with accommodation of the fasteners in close tolerance magazine and fastener driving structures of fastener driving machines. There is no problem of dislodged glue gumming up or packing and jamming the fastener driving mechanism. Fusion of the juncture couplings 14, occurs at the surfaces of the limited heated areas of the thermoplastic coating and substantially without either thinning or thickening of the respective adjoining coatings, even though the fasteners are pressed firmly toward one another. This results from the spacer action of the abutting unfused areas of the fasteners.

By having only limited areas of the thermoplastic coatings of the fasteners fusion bonded or coupled, sufficient to resist anticipated handling abuses, resistance to separation or shearing of the juncture couplings 14 incident to driving the fasteners is minimized.

Substantial savings accrue as compared to adhesively secured fasteners by the elimination of any separately applied adhesive material, and by the elimination of glue pot maintenance. In addition, the safety hazards of fire and noxious and explosive volatile fumes inherent in the use of the customary adhesives are entirely eliminated.

It will be understood that modifications and variations may be effected without departing from the scope of the novel concepts of the present invention.

I claim as my invention:

1. A method of securing fasteners of the kind to be driven in semi-automatic fastener driving machines,
    which comprises assembling in stick relationship precoated fasteners having solidified thermoplastic coatings,
    and while maintaining the coatings on the contiguous portions of the fasteners in abutment fusing limited areas of the abutting coatings while utilizing the remainder of the abutting coatings as spacers, whereby to maintain the fused portions of the coatings at substantially twice the thickness of the individual coatings.

2. A method of securing fasteners as defined in claim 1, in which said fusing of the limited areas is effected by subjecting them to flame heating, and cooling the fused areas to retain the fasteners in the stick relationship.

3. A method as defined in claim 1, comprising electrically heating said limited areas of the coatings of the fasteners, and cooling the fused areas to maintain the fasteners in the stick relationship.

4. In a method of securing into stick relationship a series of fasteners precoated with a heat-responsive plastic,
relatively longitudinally moving the fasteners and a source of heat applied to only limited aligned areas of the fasteners to bond the coatings of those limited aligned areas of the fasteners while pressing the coatings into contiguity and utilizing the unheated portions of the coatings as spacers, and cooling the coatings.

5. A method of securing thermoplastically precoated fasteners into stick form comprising,
assembling the fasteners in stick relationship,
applying pressure longitudinally of the stick to force the fasteners into serial contiguity,
applying heat to only a narrow band portion of the stick to soften the thermoplastic coating of the fasters in said narrow band only and thereby fusing the coatings of the fasteners in said narrow band only while utilizing portions lying outside of the narrow band portions as spacers,
whereby to retain the fasteners in the stick relationship and requiring only breaking of the fused bond at said narrow band in separation of the fasteners successively from the stick during driving of the same.

6. A method as defined in claim 5, wherein said fasteners have heads and single shanks and said band is below said heads but substantially spaced from the tip ends of the shanks.

7. A method as defined in claim 5, wherein said band of heat and fusing is applied adjacent to the heads of the fasteners, leaving the shanks of the fasteners unconnected throughout most of their length.

8. A method of securing together fasteners of the kind to be driven in fastener driving machines comprising:
assembling in stick relationship preformed fasteners which individually carry a coat of solidified plastic material, while maintaining the coats on the contiguous portions of the fasteners in abutment bonding together limited areas of the abutting coats, and during such bonding utilizing the remainder of the solidified abutting coats as spacers.

9. In a method of securing into stick relationship formed staples precoated with a heat responsive plastic and having respective crowns and legs extending from the crowns:
assembling the precoated formed staples into stick contiguity;
maintaining the staples in such contiguity and relatively longitudinally moving the stick-related staples and a source of fusing heat;
applying said heat to the crowns and the immediately adjacent portions only of the legs of the staples for fusing the heated coat portions of the staples, while the unheated coat portions of the staples remain solid to provide proper spacing between the staples;
and cooling the fused coat portions to retain the staples in the stick form.

References Cited by the Examiner

UNITED STATES PATENTS

| | | | |
|---|---|---|---|
| 1,977,946 | 10/1934 | Kammer | 59—77 |
| 2,128,443 | 8/1938 | Vogel | 59—77 |
| 2,137,467 | 11/1938 | Vogel | 1—56 |
| 2,522,656 | 9/1950 | Whalen | 59—77 |
| 2,909,781 | 10/1959 | Ollig et al. | 206—56 |
| 2,940,081 | 6/1960 | Juilfs | 206—56 |
| 3,076,373 | 2/1963 | Matthews | 206—56 |

CHARLES W. LANHAM, *Primary Examiner.*

G. CUSTER, *Examiner.*

D. D. SCHAPER, G. P. CROSBY, *Assistant Examiners.*